(12) United States Patent
Harris

(10) Patent No.: US 10,406,640 B2
(45) Date of Patent: Sep. 10, 2019

(54) METHOD FOR REPAIRING CERAMIC MATRIX COMPOSITE (CMC) ARTICLES

(71) Applicant: Rolls-Royce High Temperature Composites, Inc., Huntington Beach, CA (US)

(72) Inventor: Stephen Isaiah Harris, Long Beach, CA (US)

(73) Assignee: Rolls-Royce High Temperature Composites, Inc., Cypress, CA (US)

(*) Notice: Subject to any disclaimer, the term of this patent is extended or adjusted under 35 U.S.C. 154(b) by 604 days.

(21) Appl. No.: 14/974,802

(22) Filed: Dec. 18, 2015

(65) Prior Publication Data

US 2016/0279744 A1    Sep. 29, 2016

Related U.S. Application Data

(60) Provisional application No. 62/095,472, filed on Dec. 22, 2014.

(51) Int. Cl.

| | |
|---|---|
| *B23K 26/50* | (2014.01) |
| *B23P 6/04* | (2006.01) |
| *H05B 6/80* | (2006.01) |
| *B23K 26/00* | (2014.01) |
| *B23K 9/00* | (2006.01) |
| *B23K 15/00* | (2006.01) |
| *C04B 35/565* | (2006.01) |
| *C04B 35/628* | (2006.01) |
| *C04B 35/80* | (2006.01) |

(Continued)

(52) U.S. Cl.
CPC .............. *B23P 6/04* (2013.01); *B23K 9/00* (2013.01); *B23K 9/0026* (2013.01); *B23K 15/00* (2013.01); *B23K 15/0006* (2013.01); *B23K 26/0006* (2013.01); *B23K 26/50* (2015.10); *C04B 35/565* (2013.01); *C04B 35/62863* (2013.01); *C04B 35/62868* (2013.01); *C04B 35/62884* (2013.01); *C04B 35/62894* (2013.01); *C04B 35/806* (2013.01); *H05B 6/80* (2013.01); *B23K 2103/08* (2018.08); *B23K 2103/16* (2018.08); *B23K 2103/52* (2018.08); *C04B 2235/3826* (2013.01); *C04B 2235/428* (2013.01); *C04B 2235/524* (2013.01); *C04B 2235/5224* (2013.01); *C04B 2235/5228* (2013.01); *C04B 2235/5236* (2013.01); *C04B 2235/5244* (2013.01); *C04B 2235/5248* (2013.01); *C04B 2235/5472* (2013.01); *C04B 2235/616* (2013.01)

(58) Field of Classification Search
CPC .. B23K 9/04; B23K 15/0086; B23K 15/0093; B23K 26/34; B23K 26/0006; B23K 2203/52; B23P 6/04
USPC ..................................................... 219/121.85
See application file for complete search history.

(56) References Cited

U.S. PATENT DOCUMENTS

| | | |
|---|---|---|
| 3,864,154 A | 2/1975 | Gazza et al. |
| 4,585,618 A | 4/1986 | Fresnel et al. |

(Continued)

*Primary Examiner* — Brian W Jennison
(74) *Attorney, Agent, or Firm* — Shumaker & Sieffert, P.A.

(57) ABSTRACT

A method for repairing a ceramic matrix composite (CMC) article including a ceramic material in a matrix including a metal alloy, wherein a localized region of the metal alloy has a defect. The method includes applying heat to the localized region for a time sufficient to increase the temperature of the metal alloy in the localized region above the melt temperature thereof and cause the metal alloy in the localized region to flow and seal the crack.

16 Claims, 1 Drawing Sheet

(51) Int. Cl.
  *B23K 103/08* (2006.01)
  *B23K 103/16* (2006.01)
  *B23K 103/00* (2006.01)

(56) References Cited

U.S. PATENT DOCUMENTS

| | | | |
|---|---|---|---|
| 4,737,476 A | 4/1988 | Hillig | |
| 4,961,990 A | 10/1990 | Yamada et al. | |
| 5,017,334 A | 5/1991 | Claar et al. | |
| 5,210,944 A | 5/1993 | Monson et al. | |
| 5,221,647 A | 6/1993 | Hida et al. | |
| 5,366,686 A | 11/1994 | Mortensen et al. | |
| 5,431,967 A | 7/1995 | Manthiram et al. | |
| 5,703,341 A | 12/1997 | Lowndes et al. | |
| 5,846,057 A * | 12/1998 | Ferrigno | B23P 6/007 416/241 R |
| 6,051,277 A | 4/2000 | Claussen et al. | |
| 6,245,424 B1 | 6/2001 | Lau et al. | |
| 6,347,446 B1 | 2/2002 | Luthra et al. | |
| 6,441,341 B1 | 8/2002 | Steibel et al. | |
| 6,670,026 B2 * | 12/2003 | Steibel | B23K 26/1476 428/293.4 |
| 6,723,279 B1 | 4/2004 | Withers et al. | |
| 6,733,907 B2 | 5/2004 | Morrison et al. | |
| 6,960,738 B2 | 11/2005 | Weekamp et al. | |
| 8,105,967 B1 | 1/2012 | Martin | |
| 2004/0121182 A1 | 6/2004 | Hardwicke et al. | |
| 2004/0238794 A1 | 12/2004 | Karandikar et al. | |
| 2005/0074355 A1 | 4/2005 | Pickard et al. | |
| 2009/0015272 A1 | 1/2009 | Jones et al. | |
| 2009/0313823 A1 | 12/2009 | Rockstroh et al. | |
| 2011/0103940 A1 | 5/2011 | Duval et al. | |
| 2012/0037604 A1 * | 2/2012 | Shikata | G02B 7/008 219/121.67 |
| 2013/0022471 A1 | 1/2013 | Roberts, III et al. | |
| 2013/0205554 A1 * | 8/2013 | Czerner | B23K 26/34 29/23.51 |
| 2013/0295304 A1 | 11/2013 | Moore et al. | |

* cited by examiner

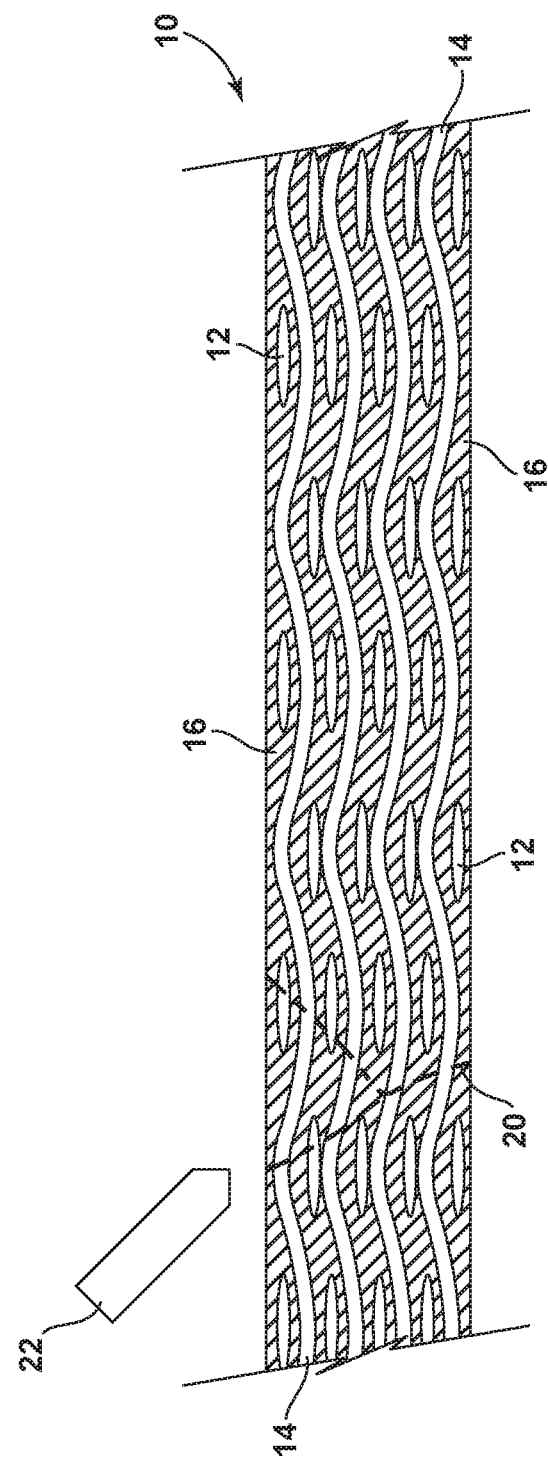

METHOD FOR REPAIRING CERAMIC MATRIX COMPOSITE (CMC) ARTICLES

This application claims the benefit of U.S. Provisional Application No. 62/095,472 filed Dec. 22, 2014, which is incorporated herein by reference in its entirety.

BACKGROUND

Reinforced ceramic matrix composite (CMC) articles are well suited for structural applications in turbine engine components because of their toughness, thermal resistance, high temperature strength and chemical stability.

CMC articles are inherently brittle ceramic materials including a metal alloy matrix that is reinforced with ceramic materials such as, for example, ceramic fibers. The presence of an interphase region between the fiber and the interstitial alloy matrix provides a location for crack deflection that produces toughness in the resulting material. When CMC components in a turbine engine are damaged due to minor overstressing, impact, and the like, cracks can form in the alloy matrix of the material, but the reinforcing fibers remain intact.

During the life of a part made of a CMC material, service methods for repairing damage should be available. In particular, repair methods that do not require removal of the CMC part from the structure are very desirable.

SUMMARY

Adhesives have been used to bond a patch to a surface of a CMC article or fill a crack therein, and mechanical repairs have utilized fasteners (e.g. rivets) to reinforce a portion of a damaged part. However, due to the brittle nature of ceramics and ceramic adhesives, neither mechanical nor adhesive based repairs have proven sufficiently effective.

In general, the present disclosure is directed to a method for locally closing cracks in a region of a CMC article to regain stiffness and environmental stability therein without affecting the remaining undamaged portion of the article. In one aspect, the method of the present disclosure utilizes an energy source to locally heat a CMC article for a time sufficient to re-melt the interstitial alloy between the ceramic fibers and repair minor defects such as, for example, cracks. Using an intense local heat-source allows higher temperatures to be used than conventional methods, due to the extremely short durations required to repair a region.

In one aspect, the present disclosure is directed to a method for repairing a ceramic matrix composite (CMC) article including a ceramic material in a matrix of a metal alloy, wherein a localized region of the metal alloy includes a defect. The method includes applying heat to the localized region for a time sufficient to increase the temperature of the metal alloy in the localized region above the melt temperature thereof and cause the metal alloy in the localized region to flow and seal the crack.

In another aspect, the present disclosure is directed to a method for repairing a ceramic matrix composite (CMC) article. The article includes a matrix material of a metal alloy selected from the group consisting of Si, B, Al, Y, Ti, Zr, oxides thereof, and mixtures and combinations thereof, and a localized region of the matrix material has a defect. The article further includes a reinforcing material in the matrix material, wherein the reinforcing material includes fibers selected from the group consisting of aluminum oxide ($Al_2O_3$), mullite ($Al_6Si_2O_{13}$), zirconium oxide ($ZrO_2$), carbon (C), graphite, silicon carbide (SiC), silicon carbon nitride, silicon nitride, and mixtures and combinations thereof. The method includes applying heat to the localized region of the article with the defect for a time sufficient to cause the matrix material in the localized region to flow and remediate the defect.

Compared to existing repair techniques, the method described in the present disclosure can be utilized to repair a damaged portion of a CMC part quickly, accurately and at a reasonable cost, without affecting the structural integrity of the remainder of the article. In some embodiments, the method of the present disclosure can be used without removing the part from the turbine engine, and the turbine engine can quickly be returned to service.

The details of one or more embodiments of the invention are set forth in the accompanying drawings and the description below. Other features, objects, and advantages of the invention will be apparent from the description and drawings, and from the claims.

BRIEF DESCRIPTION OF DRAWING

FIG. 1 is a schematic cross-sectional view of a CMC article undergoing a repair according to an embodiment of a method described herein.

DETAILED DESCRIPTION

The CMC articles utilized in the method of the present disclosure include a metal or metal alloy matrix having a suitable reinforcing material incorporated therein to enhance the properties of the matrix. In various embodiments, the CMC material used may be continuously reinforced with fibers such as, for example, carbon fibers, oxide fibers, silicon carbide monofilament fibers or other CMC materials including continuous fiber lay-ups and/or woven fiber performs. In other embodiments, the CMC article may be discontinuously reinforced with for example, ceramic, metal or alloy materials such as particulates, platelets, whiskers, discontinuous fibers, in situ and nano-composite reinforced materials or mixtures thereof. The CMC article may be made from any suitable manufacturing process known in the art such as, for example, injection molding, slip casting, tape casting, infiltration methods (e.g., chemical vapor infiltration, melt infiltration and/or the like) and various other suitable methods and/or processes.

In some embodiments, the CMC article is based on a two-dimensional or three-dimensional inorganic fiber preform, which forms a structural scaffold for subsequent infiltration of a ceramic material. To make the inorganic fiber preform, chopped fibers, continuous fibers, woven fabrics or combinations thereof are laid up, fixed and shaped into the configuration of a desired component. The fibers in the inorganic fiber preform can be made from any inorganic material that is stable at processing temperatures above about 1000° C. and is compatible with the temperature of a subsequently applied metal alloy matrix material.

Suitable examples of inorganic fibers used in the preform include, but are not limited to, aluminum oxide ($Al_2O_3$), mullite ($Al_6Si_2O_{13}$), zirconium oxide ($ZrO_2$), carbon (C), graphite, silicon carbide (SiC), silicon carbon nitride, silicon nitride, and mixtures and combinations thereof. Suitable commercially available inorganic fibers include, for example, pre-ceramic SiC fibers such as those available under the trade designation HI-NICALON and SYLRAMIC from COI Ceramics, Inc., San Diego, Calif.

In some embodiments, the inorganic fibers in the preform may be treated by applying a coating or coatings to, for example, provide a compliant layer at an interface between the fibers and the matrix composed of subsequently introduced particles or components of the particle-containing slurry and molten alloy infiltrant. In some embodiments, the fiber treatment can enhance toughness and crack deflection in the final composite article and/or prevent reaction of the reinforcing fibers with the molten alloy infiltrant. Suitable coatings include, but are not limited to, carbon, aluminum nitride, boron nitride, silicon nitride, silicon carbide, boron carbide, metal borides, transition metal silicides, transition metal oxides, transition metal silicates, rare earth metal silicates and mixtures and combinations thereof. If used, in various embodiments the fiber coating has a thickness of about 0.05 μm to 15 μm, or about 0.1 μm to about 5 μm.

In some embodiments, once the preform is shaped and rigidized, a ceramic material is infiltrated into the preform to form a green composite article. In some embodiments, this infiltration process includes immersing the preform in a slurry having ceramic particles dispersed therein. As the slurry flows into the interstices between the inorganic fibers of the preform, the ceramic particles in the slurry substantially uniformly impregnate the pores of the preform and come to reside in the interstices between the preform fibers.

In various embodiments, the ceramic particles in the CMC article include aluminum nitride, aluminum diboride, boron carbide, aluminum oxide, mullite, zirconium oxide, carbon, silicon carbide, silicon nitride, transition metal nitrides, transition metal borides, rare earth oxides, and mixtures and combinations thereof.

The size of the ceramic particles may vary widely, and typically have a major dimension of less than about 50 μm. In various embodiments, the particles may have a wide variety of regular or irregular shapes including, for example, spheres, rods, disks, and the like. In various embodiments, the major dimensions of the particles may form a monomodal, a bimodal, or a multimodal distribution. In some embodiments, the particles are generally spheres with a diameter of less than about 50 μm, and the diameters of the particles make up a multimodal distribution to more effectively pack more densely within the pores of the preform.

Following the impregnation with ceramic particles, in some embodiments a molten metal or metal alloy infiltrant is applied to the green composite article. The molten metal alloy wicks between the ceramic particles in the green composite article and occupies the interstices between the particles until the green composite article is densified. In some embodiments, the green composite article is densified to less than about 5%, or less than about 3%, or less than about 1%, porosity to form a CMC article. In various embodiments, the alloy infiltrant includes Si, B, Al, Y, Ti, Zr, oxides thereof, and mixtures and combinations thereof.

In various embodiments, the temperature for metal alloy infiltration such as for example, Si, is about 1400° C. to about 1500° C. Under these conditions, the duration of the infiltration can be between about 15 minutes and 4 hours, or about 60 minutes to about 20 minutes. The infiltration process can optionally be carried out under vacuum, but in other embodiments can be carried out in inert gas under atmospheric pressure to limit evaporation losses.

In various embodiments, the metal-infiltrated final composite article includes about 20 vol % to 60 vol % coated fiber, or about 30 vol % to 50 vol %; about 1 vol % and 79 vol % infiltrated particles, or about 35 vol % to about 60 vol %; and about 1 vol % to about 79 vol % infiltrated alloy, or about 5 vol % to about 20 vol %. In some embodiments, the composite article includes no macroscopic porosity, which in this application means pores with an average pore size of less than about 200 μm, or less than about 50 μm, or less than about 2 μm, and includes a porosity of less than about 5%, or less than about 3%, or less than about 1%.

Following the alloy densification step, the CMC article may optionally be machined to form a suitable part for use in for example, a turbine engine or an aircraft engine.

Before the CMC article is incorporated into a turbine engine, or after the CMC article has been in service in a turbine engine, inspection techniques such as, for example, visual, ultrasonic, vibrational, radiographic, thermographic, acoustic emission, laser shearography, X-Ray Computed Tomography and the like, may identify one or more defects in the part. For example, the CMC article may have melt infiltrated poorly during production and apertures or cracks may remain that are unfilled with the metal alloy. In another example, the CMC article may have developed cracks or fissures after contacting another part in a turbine engine, or may have developed cracks or fissures following contact with debris or hot gases in the fluid stream of the turbine engine.

Observed defects in a CMC article prior to or after service may include, for example, shear cracks, delamination, matrix splitting, apertures resulting from incomplete metal alloy infiltration, and fiber/matrix debonding. Matrix cracking takes place in the interstitial metal alloy matrix region of the CMC article, and debonding and delamination occur in the interphase region of the part between the ceramic fibers and the metal alloy matrix.

If defects such as cracks, fissures or apertures are present in the matrix and/or interphase regions of the material, but the reinforcing fibers are still intact, the present disclosure is directed to a method of locally closing the cracks, filling the apertures, or otherwise healing the defects to restore stiffness and environmental stability in a damaged portion of the CMC article without affecting the remaining undamaged portion of the article. The method of the present disclosure utilizes an energy source to locally heat a portion of the CMC article for a time sufficient to re-melt the interstitial alloy and repair minor defects.

Referring to the schematic cross-sectional diagram of FIG. 1, an exemplary CMC article 10 includes a woven ceramic fabric-like structure with warp ceramic fibers 12 and weft ceramic fibers 14. An alloy matrix 16 resides between the ceramic fibers 12 and 14, and a crack 20 or other defect exists in a localized region of the alloy matrix 16. A heat source 22 directs energy into the localized region of the matrix 16 to heat the alloy matrix material in that region. In some embodiments, the heat is applied to the alloy matrix material in the localized region for a time sufficient to cause the alloy matrix material in the region to flow together and remediate the defect. In some embodiments, the term flow means that the temperature of a portion of a region of the alloy matrix material containing the defect is sufficiently increased to cause a transition from a solid phase to a liquid phase in the region such that the alloy matrix material moves into and occupies the space previously occupied by the defect and the region is physically and chemically rejoined.

In some embodiments, the heat is applied to the alloy matrix material for a time sufficient to raise the temperature of the alloy matrix material in the region above its melt temperature so that the alloy in the region of the matrix 16 flows together and about the ceramic fibers 12, 14 and fills the crack 20. The flowing together of the matrix alloy heals the defect and substantially restores properties of the CMC article 10 and renders the article 10 suitable for service in a turbine engine.

Any heat source 22 may be used that is capable of heating the region containing the region of the matrix containing the defect to a temperature above its melt temperature sufficient to allow fluid motion and/or capillary wicking in a commercially useful period of time to cause the alloy to flow and heal the defect 20. Suitable examples include, but are not limited to, lasers, electrical arcs, electron beams, intense radiation sources, and microwave generators.

In various embodiments, if the alloy material making up the matrix 16 of the CMC article 10 includes Si, B, Al, Y, Ti, Zr, oxides thereof, and mixtures and combinations thereof, the region of the matrix containing the defect should be heated to about 1400° C. to about 1500° C., or about 1420° C. to about 1480° C., or about 1425° C. to about 1475° C.

The heating should be conducted for a time sufficient to close and/or fill the crack or defect 20, and of course will depend on factors including, but not limited to, the alloy material in the matrix 16, the size of the defect 20, the location of the defect 20 within the matrix 16, and the energy output of the heat source 22. In various embodiments with the alloy materials listed above, the heating time should be about 2 seconds to about 1 minute, or about 5 seconds to about 30 seconds.

The heating and repair process described above can optionally be carried out under vacuum, but in other embodiments can be carried out in inert gas at atmospheric pressure. Suitable inert gases include, but are not limited to, Argon and Nitrogen.

After the crack 20 closes or is filled, the alloy material in the matrix 16 of the CMC article 10 hardens and re-sets. Once the CMC article 10 has cooled, the article 10 may optionally be further machined to form a suitable part for use in for example, a turbine engine or an aircraft engine.

EXAMPLE

A green CMC article approximately 1.5 inches×1.5 inches×approximately 0.2 inches was fabricated using the aforementioned process by stacking 2-D woven cloth plys and pressing to form a fiber preform, coating the preform with a Boron Nitride fiber coating and rigidizing with Silicon Carbide using Chemical Vapor Infiltration. The rigidized porous body was infiltrated with an aqueous trimodal Silicon Carbide slurry containing a pre-gellant material, heated to gel the infiltrated slurry, and then the green article was dried at 150° C. for about 2 hours.

The body was then melt-infiltrated under vacuum at a temperature close to the melting point of Silicon until partially densified to simulate a part that did not infiltrate satisfactorily. To repair the sample, the green article was locally heated under flowing Argon using a Tungsten Inert Gas (TIG) welder at a current of approximately 150 Amps for approximately 10 seconds. Silicon was introduced in the form of large granules and the part was continuously heated until the molten metal was observed to infiltrate into the porous body which took an additional 5-10 seconds. Silicon was continuously added until no additional metal would infiltrate into the body and a small amount of excess was present on the surface.

In this instance no direct temperature measurement was used, but a pyrometer would be an effective means of measuring the local temperature; based on the radiation wavelength it is estimated that the specimen was heated to approximately 1500-1550° C.

The part was re-inspected using infrared thermal imaging to confirm the defects were eliminated.

Various embodiments of the invention have been described. These and other embodiments are within the scope of the following claims.

The invention claimed is:

1. A method comprising repairing a ceramic matrix composite (CMC) article comprising a reinforcing material in a matrix comprising a metal alloy, wherein at least one of a localized matrix region or a localized interphase region of the CMC article comprises a defect chosen from matrix cracking, debonding of the reinforcing material and the matrix, delamination of the reinforcing material and the matrix, and combinations thereof, the method comprising:
    heating the at least one localized region to increase the temperature of an interstitial metal alloy in the localized matrix region or localized interphase region to about 1400° C. to about 1700° C. to cause the interstitial metal alloy in the localized region to re-melt, flow and heal the defect.

2. The method of claim 1, wherein the metal alloy is chosen from Si, B, Al, Y, Ti, Zr, oxides thereof, and mixtures and combinations thereof.

3. The method of claim 1, wherein the reinforcing material is chosen from aluminum oxide ($Al_2O_3$), mullite ($Al_6Si_2O_{13}$), zirconium oxide ($ZrO_2$), carbon (C), graphite, silicon carbide (SiC), silicon carbon nitride, silicon nitride, and mixtures and combinations thereof.

4. The method of claim 1, wherein the reinforcing material comprises fibers.

5. The method of claim 1, wherein the localized region is heated by at least one of a laser, an electric arc, an intense radiation source, electron beam, and a microwave generator.

6. The method of claim 1, wherein the matrix material comprises Si and the reinforcing material comprises SiC fibers.

7. The method of claim 1, wherein the article is in an inert atmosphere.

8. The method of claim 1, wherein the article is at atmospheric pressure.

9. The method of claim 1, further comprising cooling the article.

10. A method for repairing a ceramic matrix composite (CMC) article, wherein the article comprises:
    (a) a matrix material of a metal alloy selected from the group consisting of Si, B, Al, Y, Ti, Zr, oxides thereof, and mixtures and combinations thereof; and
    (b) a reinforcing material in the matrix material, wherein the reinforcing material comprises fibers selected from the group consisting of aluminum oxide ($Al_2O_3$), mullite ($Al_6Si_2O_{13}$), zirconium oxide ($ZrO_2$), carbon (C), graphite, silicon carbide (SiC), silicon carbon nitride, silicon nitride, and mixtures and combinations thereof; the method comprising:
    applying heat to at least one of a localized matrix region or a localized interphase region of the article comprising a defect chosen from matrix cracking, debonding of the reinforcing material and the matrix, delamination of the reinforcing material and the matrix, and combinations thereof, wherein the heat is applied for a time sufficient cause the matrix material in the localized region to re-melt, flow and remediate the defect.

11. The method of claim 10, wherein the heat is applied by at least one of a laser, an electric arc, an intense radiation source, electron beam, and microwave generator.

12. The method of claim 10, wherein the heat is applied by at least one laser.

13. The method of claim 10, wherein the matrix material comprises Si and the reinforcing material comprises woven SiC fibers, and wherein the matrix material in the localized region is heated to about 1400° C. to about 1700° C.

14. A method for repairing a ceramic matrix composite (CMC) article, wherein the article comprises a Si matrix material and a reinforcing material in the matrix material, wherein the reinforcing material comprises fibers chosen from aluminum oxide ($Al_2O_3$), mullite ($Al_6Si_2O_{13}$), zirconium oxide ($ZrO_2$), carbon (C), graphite, silicon carbide (SiC), silicon carbon nitride, silicon nitride, and mixtures and combinations thereof; the method comprising:

applying heat to at least one of a localized matrix region or a localized interphase region a of the article wherein at least one of the localized matrix region or the localized interface region comprise a defect chosen from matrix cracking, debonding of the reinforcing material and the matrix, delamination of the reinforcing material and the matrix, and combinations thereof, wherein the heat is applied for a time sufficient to cause interstitial matrix material in the localized region to re-melt and flow; and adding Si matrix material in the at least one localized matrix region or localized interface region, wherein the added Si matrix material is heated above the melt temperature thereof and flows into the localized region to remediate the defect.

15. The method of claim 14, wherein the heat is applied by at least one of a laser, an electric arc, an intense radiation source, electron beam, and a microwave generator.

16. The method of claim 14, wherein reinforcing material comprises woven SiC fibers, and wherein the Si matrix material in the localized region is heated to about 1400° C. to about 1700° C.

* * * * *